(12) United States Patent
Yamada et al.

(10) Patent No.: US 8,583,343 B2
(45) Date of Patent: Nov. 12, 2013

(54) VEHICLE DRIVE CONTROL APPARATUS, TRAVEL SECTION PICK-UP APPARATUS AND METHOD OF PICKING UP TRAVEL SECTION

(75) Inventors: Kazunao Yamada, Toyota (JP); Yusuke Mizuno, Anjo (JP); Yasushi Sakuma, Chita-gun (JP); Nobuhiro Mizuno, Ichihara (JP)

(73) Assignee: DENSO CORPORATION, Kariya (JP)

( * ) Notice: Subject to any disclaimer, the term of this patent is extended or adjusted under 35 U.S.C. 154(b) by 484 days.

(21) Appl. No.: 13/013,930

(22) Filed: Jan. 26, 2011

(65) Prior Publication Data

US 2011/0184622 A1 Jul. 28, 2011

(30) Foreign Application Priority Data

Jan. 28, 2010 (JP) .................................. 2010-16646

(51) Int. Cl.
  *G01C 21/26* (2006.01)
  *G06F 19/00* (2011.01)
(52) U.S. Cl.
  USPC ............................................ 701/99; 701/521
(58) Field of Classification Search
  None
  See application file for complete search history.

(56) References Cited

U.S. PATENT DOCUMENTS 6,314,347 B1    11/2001    Koroda et al.
2009/0198398 A1  8/2009    Yamada
2009/0326750 A1* 12/2009   Ang ................................. 701/22
2010/0161166 A1* 6/2010    Yamada et al. ................. 701/22
2010/0305799 A1  12/2010   Yamada et al.

FOREIGN PATENT DOCUMENTS

| JP | H06-341844 A | 12/1994 |
| JP | 2001-183150 A | 7/2001 |
| JP | 2007-024515 A | 2/2007 |
| JP | 2008-32464 | * 2/2008 |
| JP | 2009-054072 A | 3/2009 |
| JP | 2009-205651 A | 9/2009 |
| JP | 2010-143454 A | 7/2010 |

OTHER PUBLICATIONS

OA mailed Jun. 25, 2013 in the corresponding JP application No. 2010-016646 (English translation).

* cited by examiner

*Primary Examiner* — Michael J Zanelli
(74) *Attorney, Agent, or Firm* — Posz Law Group, PLC (57) ABSTRACT

A vehicle drive control apparatus for use in a vehicle collects the number of travels in each of road sections in a traveled route for each of travel directions, extracts road sections having been traveled for more than a threshold number for each of travel directions, and stores extracted road sections as control section data maps in a durable storage medium. If the vehicle travels into the road sections stored as the control section data map, the "stored-as-the-map" road sections are identified as a series of road sections of high-travel-probability. In this manner, a series of road sections can be accurately identified as a high-probability section without having a user input of a travel destination or the like.

13 Claims, 7 Drawing Sheets

VEHICLE DRIVE CONTROL APPARATUS, TRAVEL SECTION PICK-UP APPARATUS AND METHOD OF PICKING UP TRAVEL SECTION

CROSS REFERENCE TO RELATED APPLICATION

The present application is based on and claims the benefit of priority of Japanese Patent Application No. 2010-16646, filed on Jan. 28, 2010, the disclosure of which is incorporated herein by reference.

FIELD OF THE INVENTION

The present invention generally relates to a vehicle drive control apparatus and a travel section pick-up apparatus for use in a vehicle that is at least powered by a motor that is under control of a schedule of a control index.

BACKGROUND INFORMATION

As an apparatus generally related to the above-described purpose, it is known, for example, that a hybrid vehicle drive control apparatus disclosed in Japanese patent document 1 for collecting a travel history such as a vehicle speed or the like for each of predetermined sections as learning data, for scheduling a control index for each of the predetermined sections in order to minimizing fuel consumption of a travel to a destination based on the learning data in the travel history and road conditions of the route to the destination, and for controlling the motor and an engine according to the schedule of the control index.

Further, even when a vehicle is traveling without setting a destination by the driver, a navigation apparatus disclosed in Japanese patent document 2 automatically sets the destination, predicting the destination of the travel based on the travel route history of the vehicle according to similarity/resemblance of travel time/route of the present travel with the past ones.

[Patent document 1] Japanese Patent Laid-Open No 2000-333305

[Patent document 2] Japanese Patent Laid-Open No 2001-183150

However, in the device mentioned in the above patent document 1, a destination setting operation and a path finding operation by the user are necessary.

Further, in a destination prediction scheme in the above patent document 2, it is very likely that a predicted destination misses a right destination, thereby failing to accurately identify a highly probably traveled road section to be traveled by the vehicle.

SUMMARY OF THE INVENTION

In view of the above and other problems, the present invention provides an apparatus that accurately identify a road section to be highly probably traveled by the vehicle without having a destination/travel-direction setting operation by a user/driver.

In an aspect of the present disclosure, the vehicle drive control apparatus for use in a vehicle that uses at least a motor as a driving power source that is under control of a determined schedule of a control index includes: a travel number counter for counting a number of travels of a road section in a travel route of the vehicle and for storing a number of travels of the road section by the vehicle in a storage for each of travel directions of the road section; a section extraction unit for extracting, for each of travel directions of the road section, the road section that is traveled for over-a-threshold times based on the stored number of travels of the road section in the storage; a section map memory for storing, as a section map, a series of road sections extracted by the section extraction unit in the storage; a scheduler for defining a schedule of the control index for each of the series of road sections specified by the section map; a section series identifying unit for identifying a specific series of road sections as high-probability road sections that are highly probably traveled by the vehicle when the vehicle is determined to have entered the specific series of road sections specified by the section map; and a drive control unit for performing control of the driving power source of the vehicle for the specific series of road sections identified by the section series identifying unit according to the schedule of the control index defined by the scheduler.

The above configuration of the apparatus allows it to extract the series of road sections for each of the travel directions, based on the determination that the each of the road sections in the series has the number of travels equal to or greater than a standard value, to store the extracted series of road sections as section map in the storage, and to identify the series of road sections specified by the section map as the travel section to be highly probably traveled by the vehicle upon determining that the vehicle enters the road sections in the section map, thereby enabling an accurate identification of road sections that are highly probably traveled by the vehicle without having a destination/travel-direction setting operation by a user/driver. Further, the apparatus minimizes the fuel/energy consumption by the power source for the travel of the vehicle, because (a) the schedule of the control index is defined for each of the series of road sections that are indicated by the section map, (b) the series of road sections is identified as a high-probability road section to be highly probably traveled by the vehicle upon determining that the vehicle enters the series of road sections indicated by the section map, and (c) control of the power source is performed according to the schedule of the control index defined by the scheduler.

The vehicle drive control apparatus further includes: a frequented section pick-up unit for picking up the road section that is frequently traveled at an end of a travel of the vehicle; and a section division unit for dividing the series of road sections extracted, for each of the travel directions, by the section extraction unit so that the divided series of road sections has the road section that is picked up by the frequented section pick-up unit as an end of the series of road sections. The section map memory stores, as the section map, the divided series of road sections in the storage.

When the high-probability road section is identified based on whether the number of travels of each of the road sections exceeds a threshold, a road that is in front of a driver's home extending in an east-west direction may be entirely identified as a single road section, which leads to a problem. That is, for example, even when a road section of the front road traveled by the vehicle to go to the east from the driver's home is different from a road section of the same road traveled by the vehicle to go driver's home from the west, the two road sections are considered as one road section in the above setting. However, by identifying a road section that is frequently traveled at an end of the travel of the vehicle, and by dividing the series of road sections that are extracted by the section extraction unit for each of the travel directions to have the identified road section as an end of the series of road sections, and by storing the divided series of road sections as the section map in the storage, a road section traveled by an east-bound travel departing from home is prevented from being considered as the same road section traveled by a travel, that arrives at home from the west of the front road.

In the vehicle drive control apparatus, the frequented section pick-up unit picks up the road section that is frequently traveled at the end of the travel of the vehicle, according to a distribution of the stored number of travels for each of the road sections stored in the storage by the travel number counter.

According to the configuration described above, the road section frequently traveled at the end of the travel of the vehicle is identified based exclusively on the number of travels stored in the storage by a travel number count process, the process in a control unit can be simplified.

In the vehicle drive control apparatus, the section puck-up unit picks up a road section as frequently traveled at the end of the travel of the vehicle when the stored number of travels of a certain road section is greater than the stored number of travels in at least one of two adjacent road sections by a threshold value.

The road section frequently traveled at the end of the travel of the vehicle (denoted as "a terminal" road section hereinafter) can be identified by utilizing a characteristic of the number of travels of the "terminal" road section, which is recognized as an increase of the number of travels in comparison to the number of travels of an adjacent road section located on both sides of the terminal road section.

In the vehicle drive control apparatus, the section puck-up unit picks up a road section as frequently traveled at the end of the travel of the vehicle when (a) the stored number of travels of both of two adjacent road sections of a certain road section is smaller than a standard value and (b) the stored number of travels of the certain road section is greater than half the stored number of travels of previous road sections.

When the number of travels in both of the adjacent road sections of a certain road section is smaller than a predetermined standard value, and when the certain road section has the number of travels that is equal to or greater than half the number of travels of previous road sections, the certain road section can be identified as the terminal road section, which is frequently traveled at the end of the travel of the vehicle.

In the vehicle driver control apparatus, the travel number counter acquires a signal for a determination of an end of the travel of the vehicle, collects a position of the end of the travel and the stored number of travels ending at the position based on the acquired signal, and stores the stored number of travels ending at the position in the storage, and the frequented section pick-up unit picks up, a road section that is frequently traveled at the end of the travel of the vehicle based on the stored number of travels ending at the position in the storage.

The terminal road section can also be identified by the number of travel terminations at the point of ending the travel of the vehicle.

In the vehicle drive control apparatus, the section extraction unit calculates probability of branching to each of braches at each of branch points in the extracted series of road sections, and the road section having a less-than-threshold branching probability is excluded from the series of road sections.

According to the above configuration, travel probability to each of the branches in the extracted series of road sections is calculated and the road sections having less-than-threshold travel probability is excluded from the series of the road sections. Therefore, the road sections to be highly probably traveled can be accurately identified.

By the way, there are many cases that rather waste the energy of the power source for the travel of the vehicle when a schedule of a control index is defined for a road section having a short section length in a control index scheduling scheme.

However, if the road section having a less-than-threshold section length is excluded from the extracted series of road sections by the section extraction unit of the vehicle drive control apparatus, the waste of energy by the power source for the travel of the vehicle is prevented.

Therefore, when the extracted series of road sections includes multiple parallel series of road sections, the section map memory of the vehicle drive control apparatus prioritizes, as the high-probability road section, a series of road sections including a most-traveled series of road sections from among the multiple parallel series of road sections, and the section map memory of the vehicle drive control apparatus separately stores, as the high-probability road section, other series of road sections in the multiple parallel series of road sections besides the most-traveled series of road sections.

According to the above configuration, because (a) the series of road sections including the series of road sections having the maximum number of travels is considered as data of the high-probability road section in a prioritized manner and (b) the other series of road sections are also stored in the storage separately as data of the high-probability road sections from among the parallel series of road sections in the divided series of road sections, the drive control of the vehicle according to the schedule of the control index is possible not only for the travel of the vehicle in the road section indicated by the data that is stored in the storage in the prioritized manner, but also for the travel of the vehicle in the road section indicated by the data stored in a less-prioritized manner in the storage, thereby enabling the reduction of the energy consumption by the power source for the travel of the vehicle.

Further, when the vehicle is determined as having departed from the road section for which the schedule of control index is defined for more than a standard number of times, the section extraction unit of the vehicle drive control apparatus extracts again, for each of travel directions of the road section, the series of road sections including each of the road sections traveled for above-the-threshold times, and the section map memory of the vehicle drive control apparatus stores, as the section map, the extracted series of road sections in the storage.

When the vehicle is determined to be departing from the road section that has a schedule of a control index for times equal to or more than a predetermined number, the extraction of the road section having an above-the-threshold number of travels for each of the travel directions by the section extraction unit is performed again, and the extracted series of road sections is stored in the storage as the section map, thereby enabling an update of the section map in the storage.

Further, when a predetermined term has elapsed from definition of the schedule of the control index, the section extraction unit of the vehicle drive control apparatus extracts again, for each of travel directions of the road section, the series of road sections including each of the road sections traveled for over-a-threshold times.

The update of the section map can also be performed by the extraction of the road section again after a predetermined period of time from the definition of the schedule of the control index.

In another aspect of the present invention, a travel section pick-up apparatus includes: a travel number counter for counting a number of travels of a road section in a travel route of the vehicle and for storing the number of travels of the road section by the vehicle in a storage for each of travel directions of the road section; a section extraction unit for extracting, for each of travel directions of the road section, the road section that is traveled for over-a-threshold times based on the stored number of travels of the road section in the storage; a section map memory for storing, as a section map, a series of road sections extracted by the section extraction unit in the storage; and a section series identifying unit for identifying a specific series of road sections as a high-probability road section that is highly probably traveled by the vehicle when the vehicle is determined to enter the specific series of road sections specified by the section map.

The present invention can be considered as a travel section pick-up apparatus for accurately identifying the road section of high travel probability, which does not demand the destination/travel-direction setting operation, because the travel number counter counts a number of travels of a road section in a travel route of the vehicle and for storing the number of travels of the road section by the vehicle in a storage for each of travel directions of the road section; the section extraction unit extracts, for each of travel directions of the road section, the road section that is traveled for over-a-threshold times based on the number of travels of the road section stored in the storage; the section map memory stores, as a section map, a series of road sections extracted by the section extraction unit in the storage; and the section series identifying unit identifies a specific series of road sections as a high-probability road section that is highly probably traveled by the vehicle when the vehicle is determined to enter the specific series of road sections specified by the section map.

DETAILED DESCRIPTION

Figure 1:
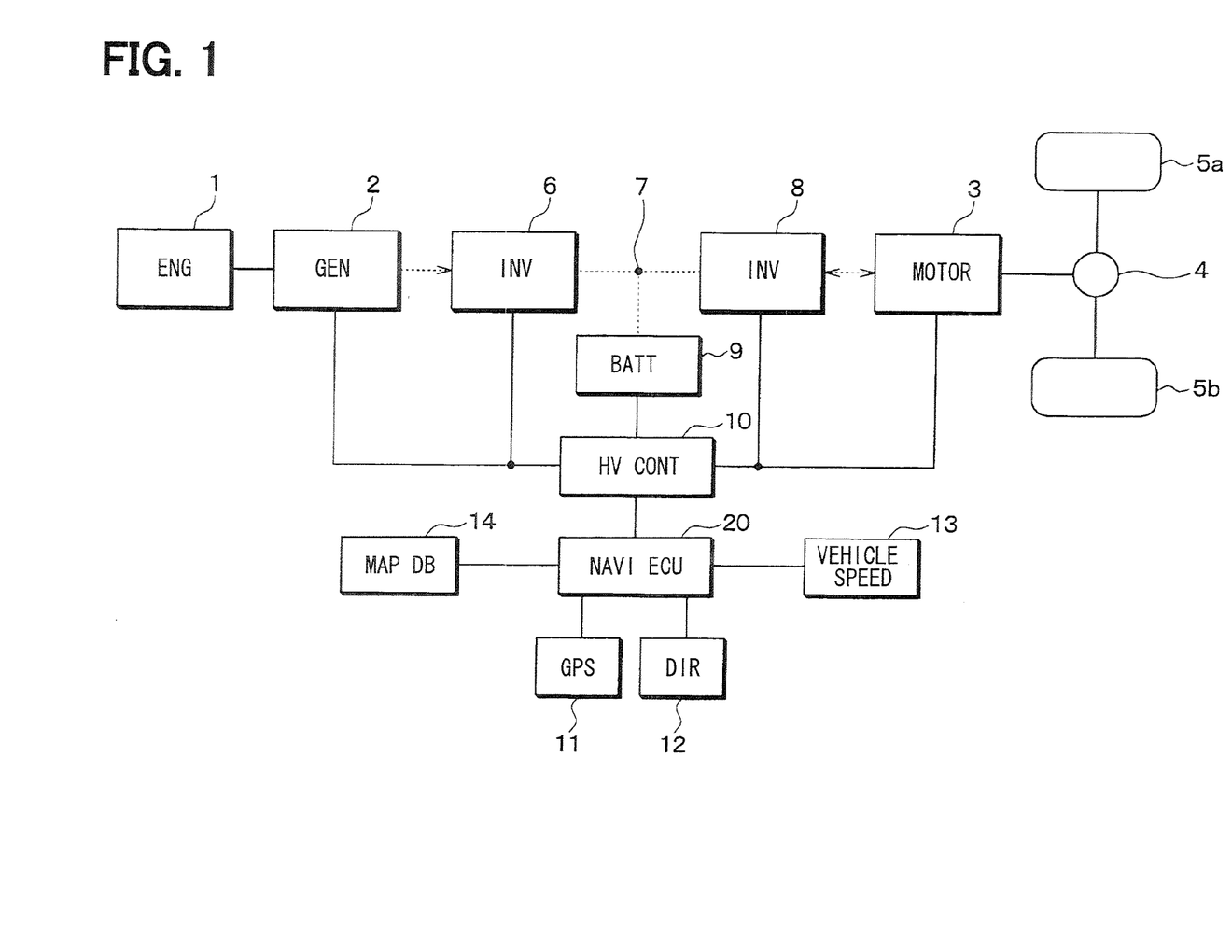
FIG. 1 is a schematic diagram of a hybrid vehicle in an embodiment of the present disclosure.

The present invention is described as an embodiment and its modifications. FIG. 1 shows a schematic diagram of a hybrid vehicle in an embodiment of the present disclosure. The hybrid vehicle includes an internal combustion engine 1, a generator motor 2, a power motor 3, a differential device 4, a tire 5a, a tire 5b, an inverter 6, a DC link 7, an inverter 8, a battery 9, an HV controller 10, a GPS receiver 11, a direction sensor 12, a vehicle speed sensor 13, a map DB storage 14, and a navigation ECU 20.

The hybrid vehicle travels, by using the engine 1 and the motor 3 as its driving power source. When the engine 1 is used as a power source, the rotation force of the engine 1 is transmitted to the tires 5a and 5b through the clutch mechanism (not shown in the drawing) and the differential device 4. When the motor 3 is used as a power source, the direct current electric power of the battery 9 is converted into the alternating current electric power by the DC link 7 and the inverter 8, and the motor 3 is driven by the alternating current electric power to transmit the rotation force of the motor 3 to the tires 5a and 5b through the differential device 4. Hereinafter, the travel mode of the hybrid vehicle is designated either as two modes of an engine-powered travel or a motor-assisted travel depending on the power source. That is, when the vehicle is traveling solely on the power of the engine 1, the vehicle is in an engine-powered travel mode, and, when the vehicle is traveling on the power of at least the motor 3, the vehicle is in a motor-assisted travel mode.

Further, the rotation force of the engine 1 is also transmitted to the generator motor 2 to generate the alternating current electric power, and the generated alternating current electric power is converted into the direct current electric power by the inverter 6 and the DC link 7. The direct current electric power is stored in the battery 9. In this case, the charging of the battery 9 is the charging by the operation of the engine 1 which uses fuel. Hereinafter, the charging of the electric power generated by the generator motor 2 is designated as an internal-combustion charging.

Further, at the time of braking of the hybrid vehicle, the resisting power of braking from the tires 5a, 5b is utilized to drive the motor 3, thereby generating the alternating current electric power that is to be converted into the direct current electric power by the inverter 8 and the DC link 7, and the direct current electric power is stored in the battery 9. Hereinafter, the charging of the electric power generated by the motor 3 at the time of braking is designated as re-generation charging.

The HV controller 10 controls, according to an instruction from the navigation ECU 20 or the like, execution and non-execution of an operation of the generator motor 2, the power motor 3, the inverters 6, 8 and other components as described above.

More specifically, the HV controller 10 stores a "current SOC" value and a "standard SOC" value, and performs the following processes A and B.

Process A

The process A receives a control index from the navigation ECU 20 as a control target value (i.e., a planned SOC), and changes the standard SOC value in order to control actuators of the generator motor 2, the power motor 3, the inverter 6, the inverter 8 together with other components, so that the charge amount of the battery 9 comes closer to the planned SOC.

Process B

The process B notifies the navigation ECU 20 of the current SOC at regular intervals.

The acronym "SOC" means "State of Charge," which is an index of a remaining amount of charge in the battery 9, taking a greater value when the remaining charge amount of the battery is greater. The current SOC value is the value observed at the current moment. The current SOC value is regularly updated by the HV controller 10 based on the detected condition of the battery 9. The standard SOC value is a control target value, which is used by the HV controller 10 to determine whether to perform the electricity generation or the motor-assisted travel of the vehicle.

The HV controller 10 switches the travel modes of the hybrid vehicle, between the engine-powered travel and the motor-assisted travel based on the control target value from the navigation ECU 20, and also switches between execution and non-execution of the internal-combustion charging and the regeneration charging. The control target value in the present embodiment is the planned SOC. The HV controller 10 determines travel mode of the hybrid vehicle and performs control of the actuator based on the determined travel mode so that the current SOC is kept to a value that is either equal to or close to the planned SOC.

When the control target value is not input from the navigation ECU 20, the HV controller 10 independently performs the drive control according to the vehicle speed, the opening degree of an accelerator and the like.

The GPS receiver 11, the direction sensor 12 and the speed sensor 13 are well-known sensors for detecting the position, the travel direction and the travel speed of the hybrid vehicle. The map DB storage 14 is a storage medium for storing map data.

The map data have node data corresponding to each of plural crossings and link data corresponding to each of road sections (i.e., links), each of which links two crossings. One node data includes an ID number of the node concerned, position information, and classification information. Further, one link data includes an ID number (designated as a link ID hereinafter) of the link concerned, section length information, position information, and classification information.

Figure 2:
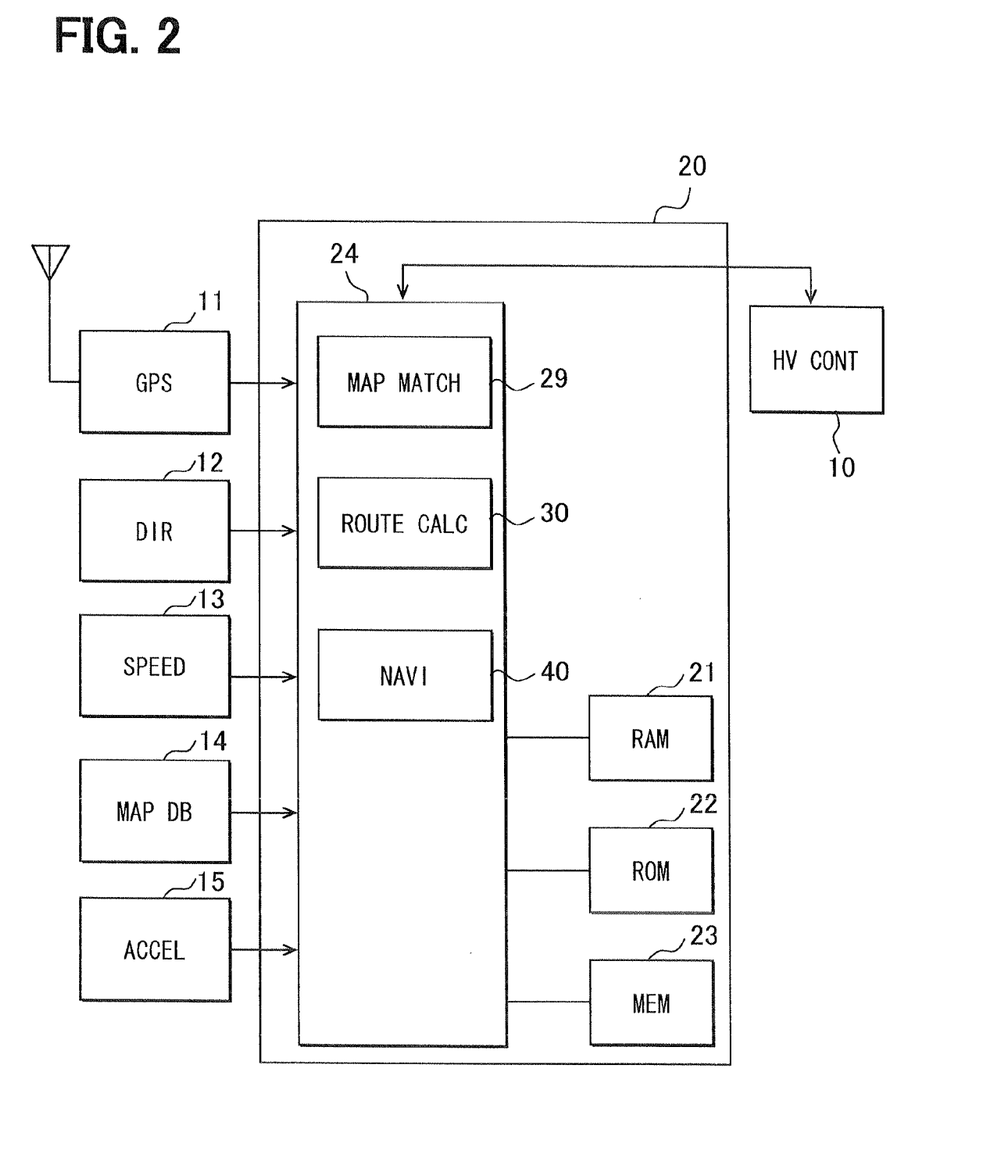
FIG. 2 is a block diagram of a navigation ECU and connected components in the embodiment.

As shown in FIG. 2, the navigation ECU 20 has a RAM 21, a ROM 22, a durable storage medium 23 on which data is writable, and a control unit 24. The durable storage medium 23 is a storage medium which can retain data even when the supply of the main electrical power for the navigation ECU 20 stops. For example, a non-volatile memory medium such as a hard disk, a flash memory, an EEPROM or the like as well as a back-up RAM may serve as the durable storage medium 23.

The CPU in the navigation ECU 20 carries out various processing according to programs memorized in the ROM 22 or the durability storage medium 23. Based on the position information acquired from the GPS receiver 11, the direction sensor 12, and the vehicle speed sensor 13, the navigation ECU 20 performs a position determination process for determining a current position of the vehicle, a map matching process 29 for determining which road the vehicle is currently traveling and for correcting the current position of the vehicle onto a road on the map, a route calculation process 30 for calculating an optimum travel route to a destination, a navigation process 40 for guiding a driver to the destination of the travel along the route and the like.

By the way, it is highly likely that a prediction by the apparatus misses a right destination, thereby failing to accurately identify a highly probably traveled road section to be traveled by the vehicle.

As a result of study for solving such a problem, it has proven to be effective that one east-west road section in front of one's home, for example, should be divided into small sections to be identified as an east outbound section that is frequently used for a travel to the east from home, a west inbound section that is frequently used for a travel to home from the east, a west outbound section that is frequently used for a travel to the west from home, and an east inbound section that is frequently used for a travel to home from the west. That is, it is effective to extract road sections, for each of the travel directions, to be stored as a section map.

In other words, by collecting the number of travels by the vehicle in each of the road sections and by extracting frequently traveled road sections as a section map for each of the travel directions, when the hybrid vehicle is detected to enter the road sections in the section map, the road sections are determined as a "frequented(=high-probability)" series of road sections, and a preset schedule of the control index for minimizing energy consumption by, the driving power source in the "frequented" series of road sections stored as the section map is effectively utilized Hereinafter, the frequented series of road sections stored in the storage medium 23 may be designated as "control sections," which are under control of the schedule of the control index.

The navigation ECU 20 in the present embodiment collects (i.e., counts) the number of travels of the vehicle having the ECU 20 respectively for each of the travel directions, and stores the colleted number of travels in the durable storage medium 23 separately for each of the travel directions by performing a travel number storage process Further, by performing a control section prediction process, a "high-probability" road section series that is traveled by the vehicle with high probability is identified based on the collected number of travels derived from the travel number storage process, and the identified series of road sections is stored in the storage medium 23 as collective data of road sections to be controlled (i.e., a section map in claims).

Figure 3:
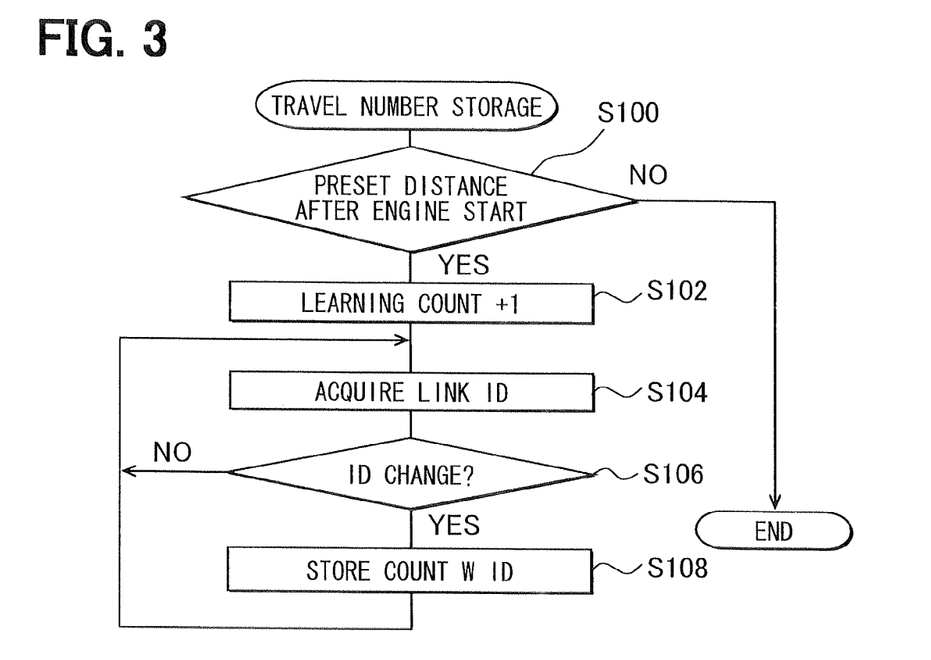
FIG. 3 is a flowchart of a counting process in the embodiment.

The travel number storage process is explained with reference to a flowchart in FIG. 3. When an ignition switch of the vehicle is turned on, the navigation ECU 20 is put in operation and the process shown in FIG. 3 is regularly carried out.

At first, it is determined whether the vehicle has traveled more than a preset distance (for example, 10 meters) after the engine is turned on (S100). For the determination whether or not the vehicle has traveled more than a preset distance after the engine is turned on, a signal from the vehicle speed sensor 12 is utilized.

When it is determined that the vehicle has not traveled more than a preset distance after an engine is turned on, the determination of S100 becomes NO, and the present process is concluded.

Further, when the vehicle has traveled more than a preset distance after the engine is turned on, the determination of S100 becomes YES, and the learning count is incremented by one (S102) In the present embodiment, the learning count is configured to be stored in the durable storage medium 23, and the learning count incremented by one is stored in the durable storage medium 23 together with information on the date, month and year, when the vehicle has traveled more than a preset distance.

Then, the link ID of a link currently being traveled is acquired (S104). More practically, the link ID of the current link is identified with reference to the map data, and the travel direction in the current link is determined based on which of start point coordinates of the link and end point coordinates of the link are passed first. In other words, whether the vehicle is traveling in the forward direction or in the backward direction in the current link is determined. When the vehicle is determined to have passed the start point coordinate of the link first, it is determined that the vehicle is traveling the link in the forward direction, and, when the vehicle is determined to have passed the end point coordinate of the link first, it is determined that the vehicle is traveling the link in the backward direction.

Then, it is determined whether the link ID is changed (S106). More practically, based on the map matching process, whether the link ID of the current link is changed is determined.

When the link ID of the current link is not changed, the determination of S106 becomes NO, and the process returns to S104.

When the vehicle enters the next link and the link ID of the current link is changed, the determination of S106 becomes YES, and data for the prediction of the control section is stored in the durable storage medium 23 (S108). More practically, the learning count about the link before the change is determined, and the determined learning count is stored in the durable storage medium 23 in association with the link ID for each of the travel directions, and the process returns to S104.

By repeating steps of S104 to S108, the number of travels for each of the travel directions is stored in the durable storage medium 23. Then, the process is concluded when the ignition switch of the vehicle is turned off.

According to FIG. 4, the control section prediction process is explained in the following. When the ignition switch of the vehicle is turned on, the navigation ECU 20 carries out the control section prediction process in parallel with the travel number storage process shown in FIG. 3.

At first, the number of travels of each link memorized to the durable storage medium 23 is retrieved (S200). More practically, the number of travels of each of the road sections which have been traveled at least once is retrieved from the durable storage medium 23. FIG. 5 shows an example of the road sections that have traveled at least once.

Figure 6:
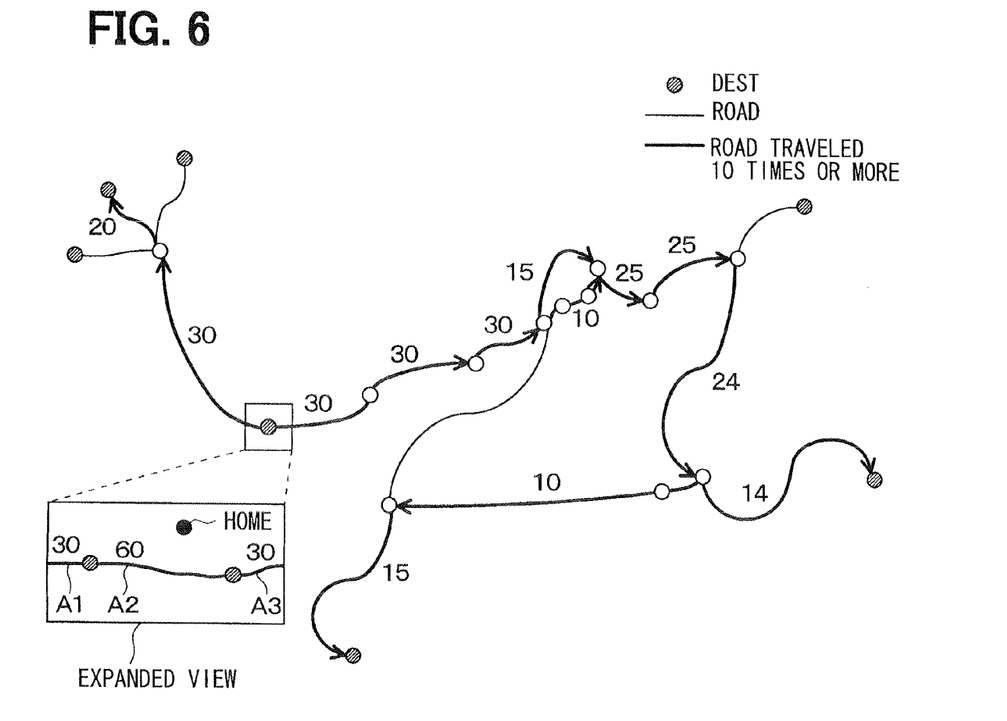
FIG. 6 is another illustration of the section map in the embodiment.

Then, the high-probability road section is extracted as a series of road sections that have the number of travels above a certain threshold (e.g., 10 times or more) (S202). An example of extracted section is shown in FIG. 6. The numbers in FIG. 6 show the number of travels along the indicated sections that have been traveled at least 10 times. Further, the situation in the proximity of a driver's home is shown in a detailed map in a window. Further, FIG. 6 shows the travels of the vehicle starting from the driver's home only (i.e., outbound travels from the driver's home only).

Then, an end to cut the control section into pieces is chosen (S204). In the present embodiment, with reference to the durable storage medium 23, the road section traveled at the end of the travel of the vehicle is identified based on the distribution of the number of travels of each of the road sections, and the identified road section is determined as an end. The end for cutting the road section is chosen, because the series of road sections extracted in S202 has to be divided. That is, for example, the road section in front of the driver's home, which should have been traveled at the end of the travel for many times, has to be divided, for the purpose of defining a schedule of the control index that minimizes the energy consumption by the driving power source of the vehicle.

Figure 7:
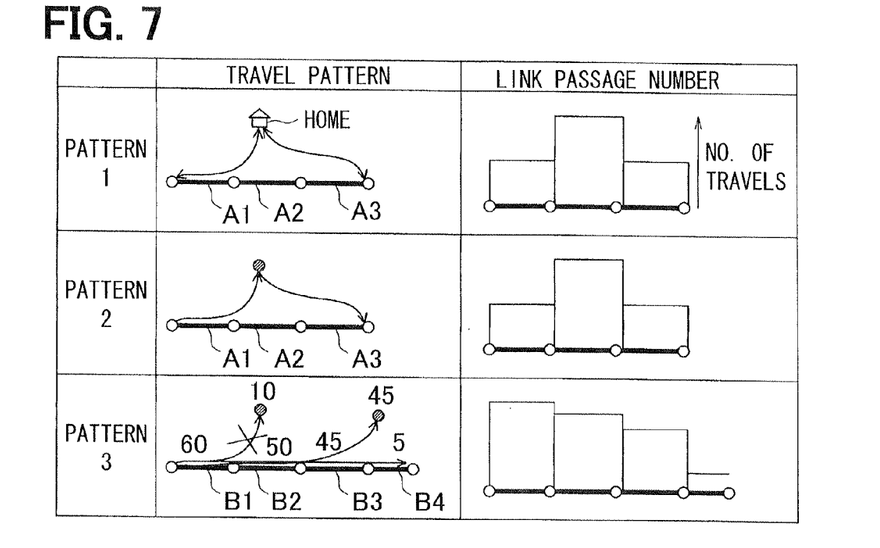
FIG. 7 is an illustrative diagram of section selection algorithm in the embodiment.

FIG. 7 shows three travel patterns of the vehicle in the road section in front of the driver's home. How to choose an end section is explained with reference to each of those patterns.

(1) Pattern 1

The pattern 1 illustrates a situation that an end point of the travel of the vehicle such as a home, a company's office or the like is chosen as an "end." When the vehicle is parked at the end point of the travel, counting of the number of travels ends at a road section that is positioned in front of the end point of the travel (i.e., the home, the company's office), and counting of the number of travels starts at the road section that is in front of the end point of the previous travel when the next travel is started therefrom. For example, as shown in a column "TRAVEL PATTERN," when the vehicle is parked at the driver's home after a travel from the left side of illustration traveling through a road section in front of the driver's home, the vehicle travels a road section A1 on the left side once, and travels a road section A2 adjacent to the road section A1 once. Then, the vehicle departing from the driver's home to go to the right side of the illustration travels the road section A2 once, and travels a road section A3 that is adjacent to the road section A2 once. Therefore, in total, the numbers of travels in the road section A1, A2, A3 are once, twice, and once, respectively, as shown in a column "LINK PASSAGE NUMBER." By recognizing the above described feature regarding the number of travels of the vehicle, a road section is identified as frequently traveled at the end of the travel, when the number of travels of a certain road section is greater than the number of travels of adjacent road sections by a preset standard number or more. The identified road section is then chosen as an "end."

In case that the vehicle exits from the road section in front of the shopping center and travels in the parking building for parking in a parking building of a large shopping center or the like, the road section in front of the parking building is identified as the road section frequently traveled at the end of the travel.

Figure 8:
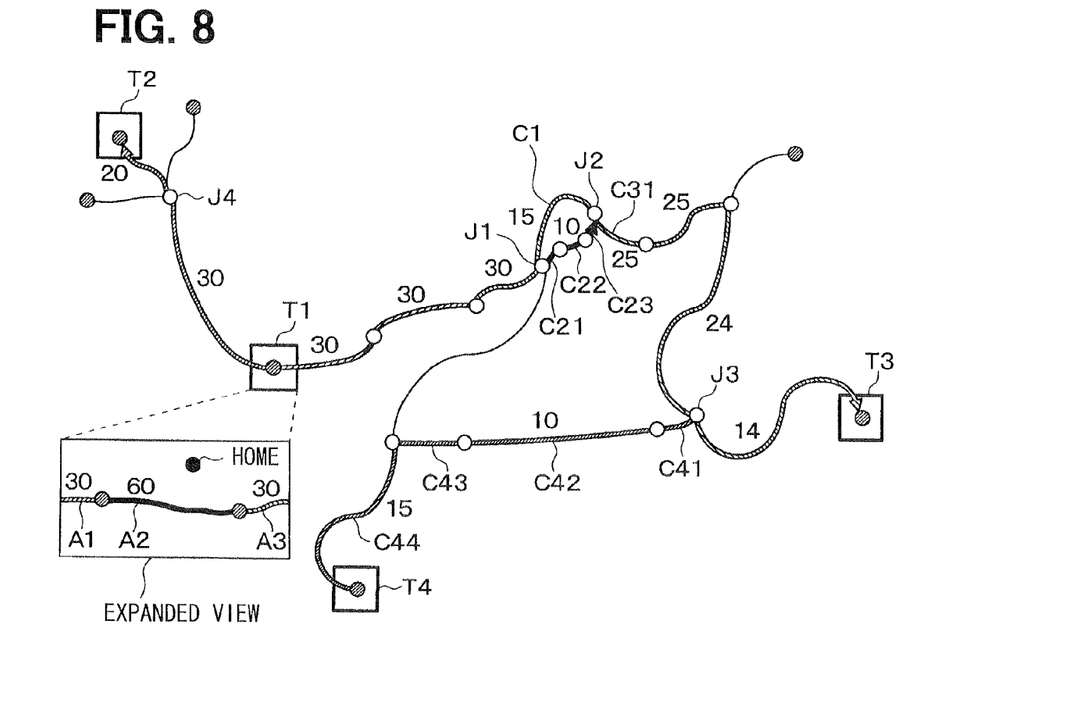
FIG. 8 is still another illustration of the section map in the embodiment.

In this manner, the road section A2 in front of the driver's home is chosen as an end T1, as shown in FIG. 8. Other ends T2 to T4 in FIG. 8 are ends identified in S202, in the course of extraction of the series of road sections for each of the travel directions.

(2) Pattern 2

In the pattern 2, a waypoint such as a bank, a drug store or the like is chosen as the "end." In this case, too, the road section having the number of travels greater than adjacent road sections by a preset number or more is identified as the road section that is frequently traveled at the end of the travel, and is chosen as an "end," in the same manner as the pattern 1.

(3) Pattern 3

The pattern 3 chooses, as an "end," a certain road section when (a) adjacent road sections of the certain road section have the number of travels less than a preset standard number, and (b) the number of travels of a certain road section is greater than half the number of travels of each of the previous road sections, on a condition that an extracted series of road sections has a branch point included therein. For example, when the preset standard number is 10, the number of travels in an adjacent road section B4 is 5, as shown in the column "TRAVEL PATTERN," and the number of travels in a road section B3 is more than half the number of travels in each of road sections B1, B2 (i.e., 60, 50), which is previous to the road section B3, the road section B3 is chosen as an "end." The scheme described above means that, in case there is a branch point in the extracted series of road sections, the end is set to prioritize a series of road sections having a greater number of travels.

In other words, when the series of road sections T1-J1-J2-J3-T3 extracted for each of the travel directions has a branch point J3, as shown in FIG. 8, the point T3 chosen as an "end," which prioritizes a branch, from among plural branches, having a greater number of travels. Therefore, the high-probability road section is determined as T1-J1-J2-J3-T3.

Further, in this case, the series of road sections J3-T4 having a smaller number of travels is also determined as another high-probability road section, separately from the series of road sections T1-J1-C1-J2-J3-T3. When the series J3-T4 having a smaller number of travels is chosen, road sections C41 and C44 on both ends of the series are chosen as an "end," and the series of road sections extracted in S202 for each of the travel directions is divided by using the ends C41 and C44.

As described above, based on the distribution of the number of travels of each of the road sections stored in the durable storage medium 23, a road section frequently traveled at the end of the travel of the vehicle is chosen as an "end."

Further, separately from end choice as described above in three patterns, an "end" section is also chosen from among the extracted series of sections for each of the travel directions, extracted in S202 when two or more sections runs in parallel with each other in the extracted sections.

As shown in FIG. 8, when two "parallel-running" series of sections, that is, a section C1 and a series of sections C21 to C23 running in parallel, are included in the extracted series of sections T1-J1-J2-J3-T3, a series of sections including a more frequently traveled section C1 is prioritized than the series of sections C21 to C23. Therefore, the high-probability road section series is identified as T1-J1-C1-J2-J3-T3.

Further, the less traveled road section series C21-C23 is also stored in the durable storage medium 23, separately from the series of sections T1-J1-C1-J2-J3-T3. In this case, both of end sections C21 and C23 are chosen as an "end" of the section series C21-C23, and the extracted series of sections extracted in S202 is divided by using the two ends C21 and C23.

Further, in the present embodiment, when the extracted series of sections has a branch in the middle, an "end" is chosen for the division of the extracted series of sections for each of the travel directions.

Figure 4:
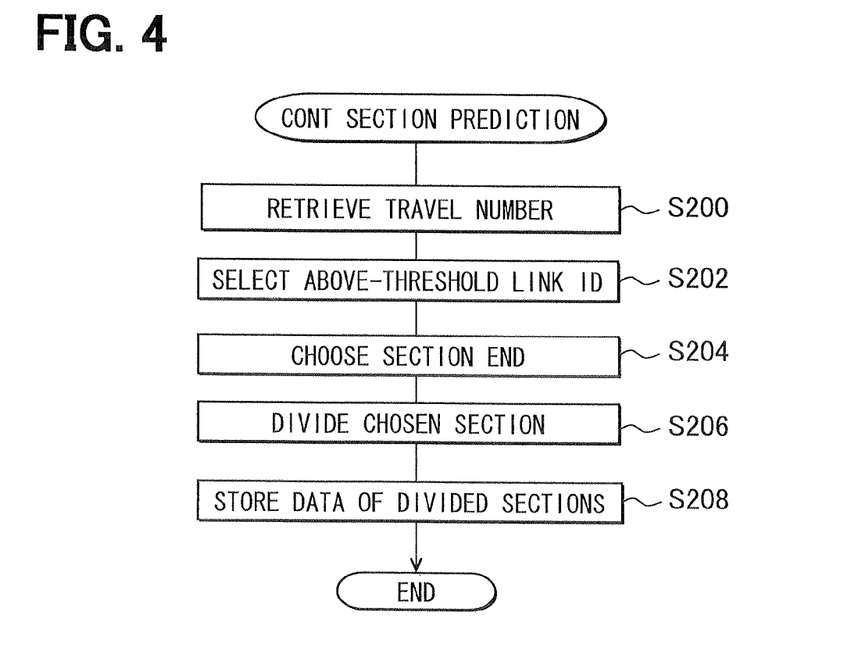
FIG. 4 is a flowchart of a section estimation process in the embodiment.
Figure 5:
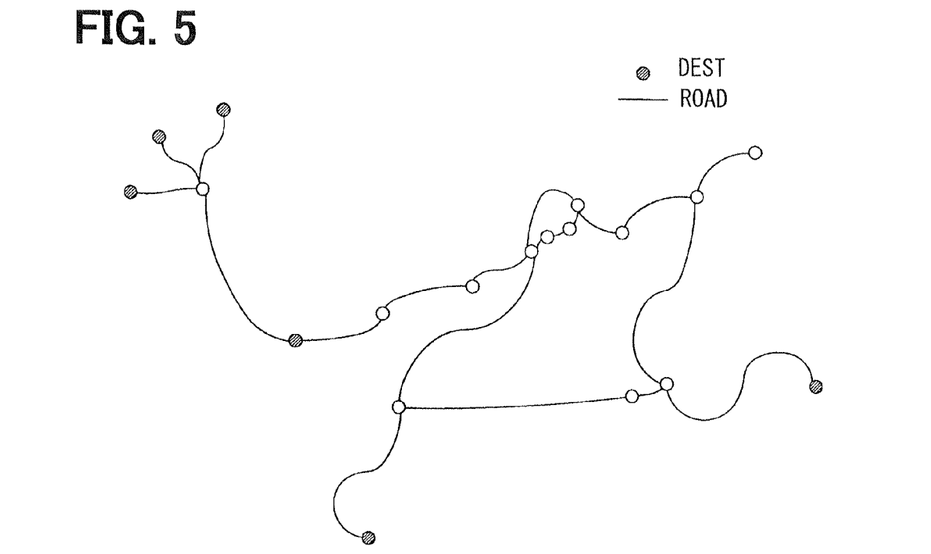
FIG. 5 is an illustration of a section map in the embodiment.

Then, in S206 of FIG. 4, the series of road sections extracted in S202 for each of the travel directions is divided so that the series of sections has the road sections chosen in S204 as its end. More practically, as shown in FIG. 8, the series of road sections is divided so that each of the road sections A2, C21, C23, C41 becomes an "end" of the series of sections. In this manner, the series of road sections extracted in S202 for each of the travel directions is divided into four series of road sections, that is, sections T1-T2, sections T1-J1-C1-J2-J3-T3, sections J1-C21-C22-C23-J2, and sections J3-T4.

Figure 9:
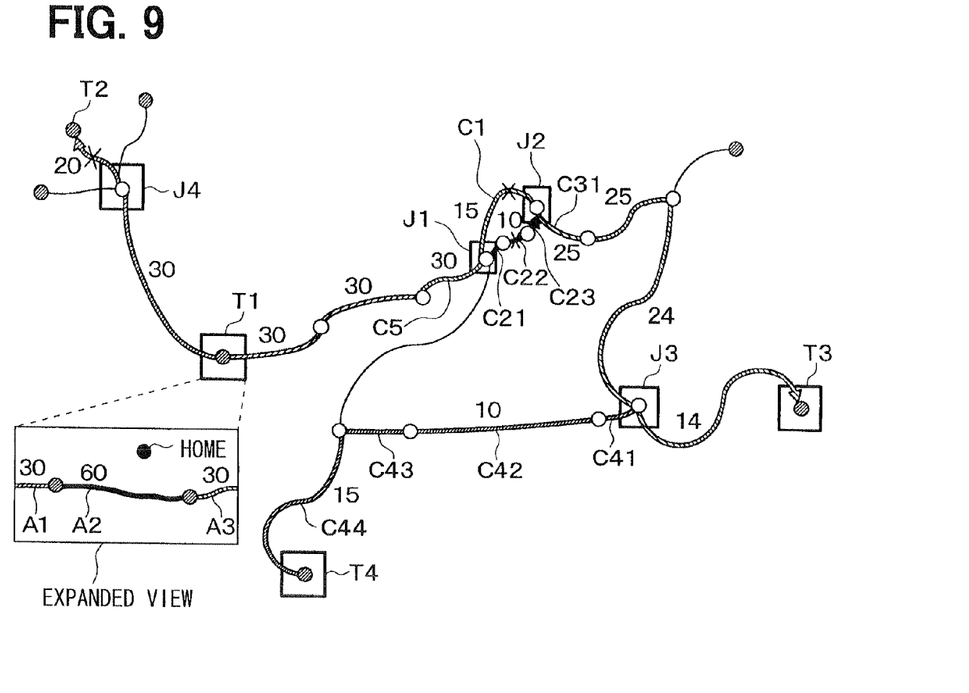
FIG. 9 is still yet another illustration of the section map in the embodiment.

Further, for each branch of each of branch points on the extracted series of road sections, travel probability is calculated, and a road section having a less-than-threshold travel probability is considered as "below-standard" and is divided. More practically, when a threshold travel probability is set as 70%, both of the section C1 (traveled 15 times) and section C21 (traveled 10 times) are considered as "below-standard," because travel probability for section C1 from the branch point J1 is 15/30 (50%), and travel probability for sections C21 from the branch point J1 is 10/30 (33%), in case that the number of travels of a section C5 is counted as 30 times, as shown in FIG. 9. Therefore, the previous road section C5 before the branch point J1 is set as an "end," and the series of road sections T1-J1-C1-J2-J3-T3 is divided at the branch point J1.

Further, the road section C31 just after the branch point J2 is also set as an "end," and the series of road sections T1-J1-J2-J3-T3 is divided so that the road section C31 just after the branch point J2 becomes an "end."

Therefore, the series of road sections T1-J1-J2-J3-T3 is divided into two series of sections T1-J1 and J2-J3-T3.

Further, the series of road sections T1-J4-T2 has a branch point J4 as shown in FIG. 9, and the travel probability for the section T2 is 20/30 (67%), which is below the threshold of 70%, based on the number of travels of the road section before the branch point J4 is 30 times and the number of travels for the section T2 is 20 times. Therefore, the branch point J4 is considered as an "end," and the series of road sections is divided at the point J4.

Further, if the series of road sections has a length under a threshold (e.g., 2 kilometers), the series of road sections having the under-the-threshold length is excluded.

Then, the series of road sections after the division in S206 are stored in the durable storage medium 23 as data of high-probability series of road sections (S208), and the present process is concluded.

In the present embodiment, the navigation ECU 20 performs a scheduling process for each of the divided series of road sections based on the data in the durable storage medium 23, and stores the planned schedule in the durable storage medium 23.

The navigation ECU 20 in the present embodiment collects travel information of each of the road sections when the vehicle travels, for the purpose of planning a schedule of the control index, and stores the collected travel information The collected travel information includes road gradient, re-generation power amount, section generation power amount, vehicle speed, the number of stop lines, and the like. The navigation ECU 20 performs the scheduling process by using the travel information for the control index scheduling stored in the durable storage medium 23.

Figure 10:
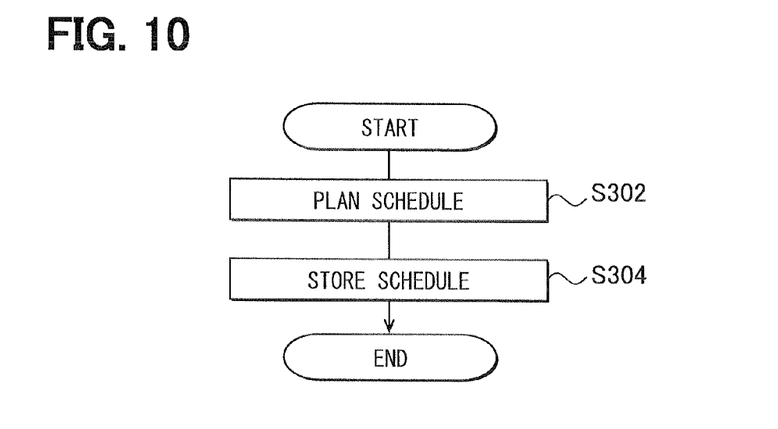
FIG. 10 is a flowchart of a scheduling process in the embodiment.

A flowchart of the scheduling process is shown in FIG. 10. The navigation ECU 20 carries out the process shown in FIG. 10 in parallel with other processes that are shown in FIGS. 3 and 4.

At first, a schedule is planned in the process (S302). More practically, based on the data of the travel information stored in the durable storage medium 23, a required amount of energy for the travel of planned sections is calculated when the divided series of road sections is used as the planned sections. Then, for each of the link IDs, a suitable travel method is determined based on the travel information stored in the durable storage medium 23. More practically, for each of the link IDs of the planned sections between the start point and the destination, whether to perform the engine-powered travel or to perform the motor-assisted travel, whether to perform the internal-combustion charging or not, and whether to perform the re-generation charging or not are determined based on the calculation of the power generation efficiency and the assist efficiency. Then, an SOC management plan for all of the road sections is created based on the travel information stored in the durable storage medium 23. The SOC management plan is an estimation of transition of the planned SOC (i.e., a control target value) toward the destination of the travel. The method of creating the SOC management plan is well-known, as disclosed in, for example, a Japanese patent document JP-A-2001-183150 or in "Development of New Energy Vehicle" pp. 123-124 (CMC publication company).

Then, the SOC management plan is stored in the durable storage medium 23 (S304), and the present process is concluded.

In this manner, a schedule of the control index is defined and the defined schedule is stored in the durable storage medium 23, for each of the divided series of road sections.

Figure 11:
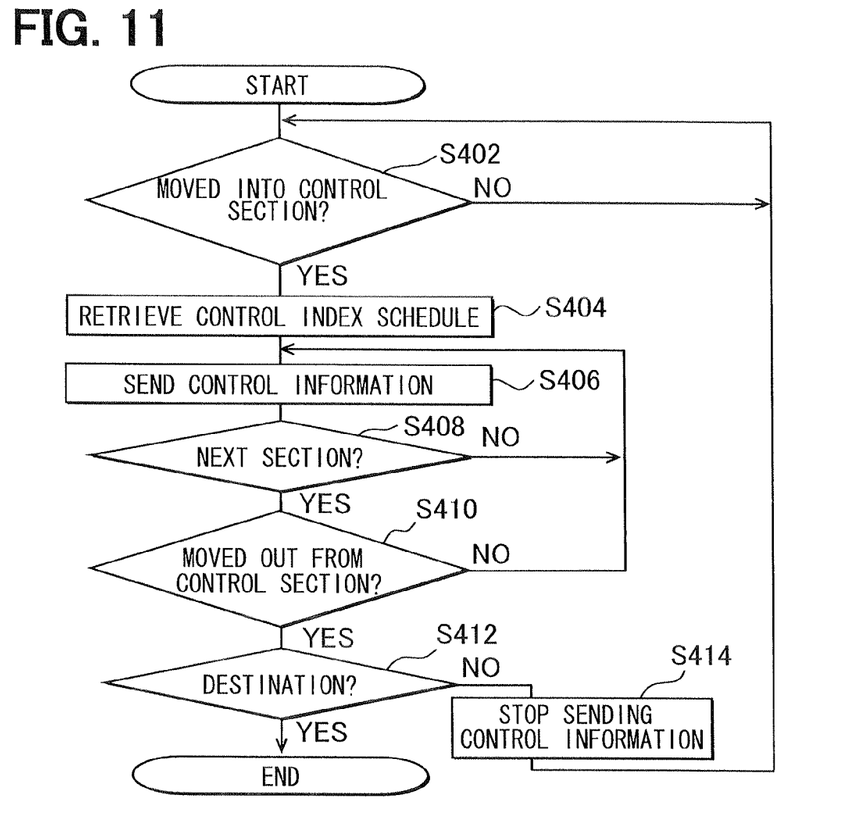
FIG. 11 is a flowchart of a drive control process in the embodiment.

Then, with reference to FIG. 11, the drive control process is explained. The navigation ECU 20 carries out a process shown in FIG. 11 in parallel with the processes shown in. FIGS. 3, 4, and 10, when an ignition switch of the vehicle is turned on.

At first, it is determined whether the vehicle moved into a control section (S402). More practically, it is determined whether the current position of the vehicle has moved into any one of control sections which is stored in the durabile storage medium 23.

If the current position of the vehicle is not in any one of the control sections, the determination of S402 becomes NO, and the determination of S402 is repeated. In this case, the engine and the motor are autonomously controlled by the HV controller 10 according to the opening degree of accelerator, the vehicle speed and the like.

When the current position of the vehicle has moved into one of the control sections stored in the durable storage medium 23, and the travel direction of the vehicle and the direction of the control section are same, the control section is identified as the high-probability road section, and the schedule of the control index for the identified control section is retrieved from the durable storage medium 23 (S404).

Then, control information according to the schedule of the retrieved control index is sent to the HV controller 10 (S406). In this manner, a low fuel consumption travel of the vehicle according to the schedule of the control index is realized.

Then, it is determined whether the vehicle have moved to the next road section (S408). More practically, it is determined whether the current position of the vehicle has moved into the next road section. The next road section, in this case, means the next section of the control section.

When the current position has not moved into the next section, the determination of S408 becomes NO, and the process returns to S406.

Therefore, the control information according to the schedule of the control index retrieved in S404 continues to be sent out to the HV controller 10.

When the current position of the vehicle is determined to be in the next section, the determination of S408 becomes YES, and then whether the vehicle has moved out from the control section is determined (S410). More practically, the current position of the vehicle has moved out from the control section is determined.

When it is not determined that the current position of the vehicle has moved out from the control section, the determination of S410 becomes NO, and the process returns to S406. Therefore, the control information according to the schedule of the control index retrieved in S404 continues to be sent out to the HV controller 10.

When it is determined that the current position of the vehicle has moved out from the control section, the determination of S410 becomes YES, and then whether the travel of the vehicle has concluded or not is determined based on an input of a signal that is indicative of use of a parking brake (S412).

When the signal showing the use of the parking brake is not input, the determination of S412 becomes NO, and sending of the control information is stopped (S414), and the process returns to S400. In this case, the engine and the motor are autonomously controlled by the HV controller 10 according to the opening degree of accelerator and the vehicle speed, after the stop of the output of the control information. If the vehicle returns to the control section, the above-described process is repeated, and the drive control according to the schedule of the control index generated for the control section which is determined as the planned section is performed.

When the signal indicating the use of the parking brake is input, the determination of S412 becomes YES, and the present process is concluded. The navigation ECU 20 in the present embodiment determines whether the vehicle has departed from the control section for more than a predetermined number of times, and, if the departure is determined as more-than-predetermined times, a data update process for updating the data of the control section by performing the control section prediction process again.

Figure 12:
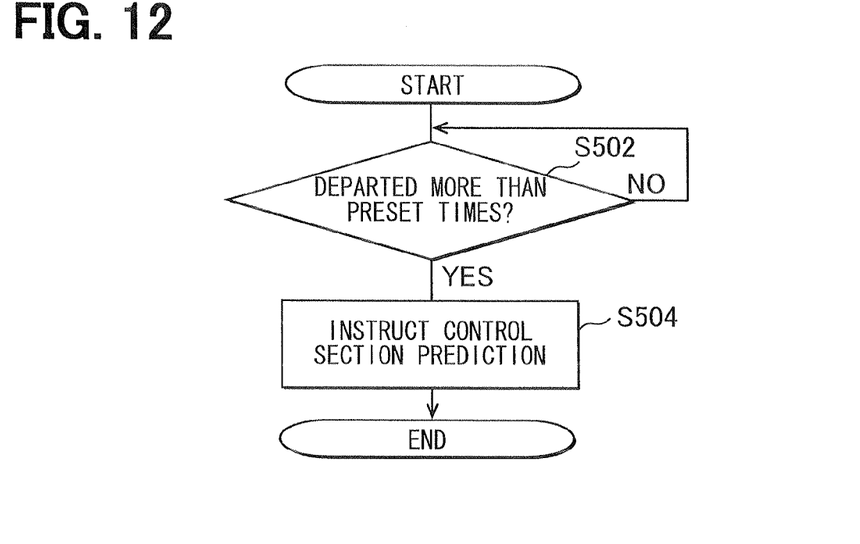
FIG. 12 is a flowchart of a data update process in the embodiment.

A flowchart of the data update process is shown in FIG. 12. The navigation ECU 20 performs the data update process in parallel with the processes shown in FIGS. 3, 4, 10, and 11.

At first, it is determined whether the vehicle has departed from the control section more than a predetermined number of times (S502). More practically, each time the vehicle has departed in the middle of the control section, the number of departures from that control section is counted, and it is determined whether there is a control section having the number of departures of more than the predetermined number of times.

When there is no control section departed for more than the predetermined number of times, the determination of S502 becomes NO, and the determination of S502 is repeated When the vehicle has departed from the control section for more than the predetermined number of times, the determination of S502 becomes YES, and the control section prediction process is instructed to be performed (S504). More practically, the control section prediction process shown in FIG. 4 is performed again. In this manner, the data of the control section stored in the durable storage medium 23 is updated.

The above configuration allows the extraction of the series of road sections for each of the travel directions, based on the determination that the each of the road sections in the series has the number of travels equal to or greater than a standard value, the storage of the extracted series of road sections as a section map in the durable storage medium 23, and the identification of the series of road sections specified by the section map as the travel section to be highly probably traveled by the vehicle upon determining that the vehicle enters the road sections in the section map, thereby enabling an accurate identification of road sections that are highly probably traveled by the vehicle without having a destination/travel-direction setting operation by a user/driver.

Further, the fuel/energy consumption by the power source for the travel of the vehicle is minimized, because (a) the schedule of the control index is defined for each of the series of road sections that are indicated by the section map, (b) the series of road sections is identified as a high-probability road section to be highly probably traveled by the vehicle upon determining that the vehicle enters the series of road sections indicated by the section map, and (c) control of the power source is performed according to the schedule of the control index defined by the scheduler.

Further, the following advantageous effects are expected. That is, when the high-probability road section is identified based on whether the number of travels of each of the road sections exceeds a threshold, a road that is in front of a driver's home extending in an east-west direction may be entirely identified as a single road section, which leads to a problem. For example, even when a road section of a road in front of the driver's home traveled by the vehicle to go to the east from the driver's home is different from a road section of the same road traveled by the vehicle to go to the driver's home from the west, the two road sections may be considered as one road section between two nodes. However, by identifying a road section that is frequently traveled at an end of the travel, of the vehicle, and by dividing the extracted series of road sections for each of the travel directions to have the identified road section as an end of the series of road sections, and by storing the divided series of road sections as the section map in the durable storage medium 23, a road section of the front road traveled by an east-bound travel of the vehicle departing from home is prevented from being considered as the same road section of the front road traveled by an east-bound travel of the vehicle that arrives at home from the west of the front road.

Further, the road section frequently traveled at the end of the travel of the vehicle is identified based exclusively on the number of travels stored in the durable storage medium 23, the process in the controller 10 can be simplified.

Further, travel probability to each of the branches in the extracted series of road sections is calculated and the road sections having less-than-threshold travel, probability is excluded from the series of the road sections. Therefore, the road sections to be highly probably traveled can be accurately identified.

By the way, there are many cases that rather waste the energy of the power source for the travel of the vehicle when a schedule of a control index is defined for a road section having a short section length in a control index scheduling scheme.

However, if the road section having a less-than-threshold section length is excluded from the extracted series of road sections, the waste of energy by the power source for the travel of the vehicle is prevented.

Further, because (a) the series of road sections including the series of road sections having the maximum number of travels is considered as data of the high-probability road section in a prioritized manner and (b) the other series of road sections are also stored in the durable storage medium 23 separately as data of the high-probability road sections from among the parallel series of road sections in the divided series of road sections, the drive control of the vehicle according to the schedule of the control index is possible not only for the travel of the vehicle in the road section indicated by the data that is stored in the storage in the prioritized manner, but also for the travel of the vehicle in the road section indicated by the data stored in a less-prioritized manner, thereby enabling the reduction of the energy consumption by the power source for the travel of the vehicle.

Further, when the vehicle is determined to be departing from the road section that has a schedule of a control index for times equal to or more than a predetermined number, the extraction of the road section having an above-the-threshold number of travels for each of the travel directions is performed again, and the road section frequently traveled at the end of the travel is picked up by a step described as S204, and the extracted series of road sections is divided by a step described as S206, the divided series of road sections is stored in the durable storage medium 23 as collection of data (i.e., the section map of the high-probability road sections), thereby enabling an update of the section map in the durable storage medium 23.

Further, the vehicle drive control apparatus mentioned above can be considered as a travel section identification apparatus identifying a high-probability travel section that is highly possibly traveled by the vehicle.

Although the present disclosure has been fully described in connection with preferred embodiment thereof with reference to the accompanying drawings, it is to be noted that various changes and modifications will become apparent to those skilled in the art.

For example, the vehicle drive control apparatus may also be disposed and used in a vehicle that is driven only by the motor (i.e., an electric vehicle or a fuel cell vehicle), besides the hybrid vehicle as described in the above embodiment.

Further, the travel number storage process for storing the number of travels may only be performed within an area of predetermined radius from home, or may only be performed within an area of predetermined along-the-road distance from home, instead of performing the process whenever the vehicle travels as described in the above embodiment.

Further, the data update process for updating the data of the control section may be performed at a predetermined interval from the definition of the schedule of the control index (e.g., after one month), instead of determination of the departure of the vehicle from the schedule-defined section for more than a predetermined number of times as described in the above embodiment.

Further, the road section frequently traveled at the end of the travel of the vehicle may be determined in the following manner, instead of the manner that is based on the distribution of the numbers of travels for each of the road sections stored in the durable storage medium 23 as described in the above embodiment. That is, the end of the travel of the vehicle is determined based on the signal such as a vehicle engine turn-off signal, and the position of the vehicle and the number of the travels ending at that position are collected and stored in the durable storage medium 23 based on the signal, and the road section frequently traveled at the end of the travel of the vehicle is identified based on the collected number stored in the durable storage medium 23.

Further, the exclusion of the road sections may be performed based on the travel probability for each of the branches branching from each of the branch points on the series of road sections extracted in S202, instead of the travel probability for each of the branches from each of the branch points on the series of road sections divided in S206.

Further, the exclusion of the road section may be performed based on the length of the series of road sections extracted in S202 relative to a predetermine length, instead of the length of the series of road sections divided in S206.

The components and processes are mapped to claim language in the following manner. That is, the travel number storage process in FIG. 3 is mapped to a travel number counter, the durable storage medium is mapped to a storage, S202 is mapped to a section extraction unit, S204 is mapped to a section series identifying unit, S206 is mapped to a section division unit, S208 is mapped to a section map memory, S302 and S304 are mapped to a scheduler, and the drive control process in FIG. 11 is mapped to a drive control unit.

Such changes, modifications, and summarized schemes are to be understood as being within the scope of the present disclosure as defined by appended claims.

What is claimed is:

1. A vehicle drive control apparatus for use in a vehicle that uses at least a motor as a driving power source that is under control of a determined schedule of a control index, the vehicle drive control apparatus comprising:
   a travel number counter for counting a number of travels of a road section in a travel route of the vehicle and for storing a number of travels of the road section by the vehicle in a storage for each of travel directions of the road section;
   a section extraction unit for extracting, for each of travel directions of the road section, the road section that is traveled for over-a-threshold times based on the stored number of travels of the road section in the storage;
   a section map memory for storing, as a section map, a series of road sections extracted by the section extraction unit in the storage;
   a scheduler for defining a schedule of the control index for each of the series of road sections specified by the section map;
   a section series identifying unit for identifying a specific series of road sections as high-probability road sections that are highly probably traveled by the vehicle when the vehicle is determined to have entered the specific series of road sections specified by the section map; and
   a drive control unit for performing control of the driving power source of the vehicle for the specific series of road sections identified by the section series identifying unit according to the schedule of the control index defined by the scheduler.

2. The vehicle drive control apparatus of claim 1 further comprising:
a frequented section pick-up unit for picking up the road section that is frequently traveled at an end of a travel of the vehicle; and
a section division unit for dividing the series of road sections extracted, for each of the travel directions, by the section extraction unit so that the divided series of road sections has the road section that is picked up by the frequented section pick-up unit as an end of the series of road sections, wherein
the section map memory stores, as the section map, the divided series of road sections in the storage.

3. The vehicle drive control apparatus of claim 2, wherein the frequented section pick-up unit picks up the road section that is frequently traveled at the end of the travel of the vehicle, according to a distribution of the stored number of travels for each of the road sections stored in the storage by the travel number counter.

4. The vehicle drive control apparatus of claim 3, wherein the section pick-up unit picks up a road section as frequently traveled at the end of the travel of the vehicle when the stored number of travels of a certain road section is greater than the stored number of travels in at least one of two adjacent road sections by a threshold value.

5. The vehicle, drive control apparatus of claim 3, wherein the section pick-up unit picks up a road section as frequently traveled at the end of the travel of the vehicle when (a) the stored number of travels of both of two adjacent road sections of a certain road section is smaller than a standard value and (b) the stored number of travels of the certain road section is greater than half the stored number of travels of previous road sections.

6. The vehicle drive control apparatus of claim 2, wherein the travel number counter acquires a signal for a determination of an end of the travel of the vehicle, collects a position of the end of the travel and the stored number of travels ending at the position based on the acquired signal, and stores the stored number of travels ending at the position in the storage, and
the frequented section pick-up unit picks up a road section that is frequently traveled at the end of the travel of the vehicle based on the stored number of travels ending at the position in the storage.

7. The vehicle drive control apparatus of claim 1, wherein the section extraction unit calculates probability of branching to each of branches at each of branch points in the extracted series of road sections, and
the road section having a less-than-threshold branching probability is excluded from the series of road sections.

8. The vehicle drive control apparatus of claim 1, wherein the section extraction unit excludes the series of road sections when a length of the series of road sections is less than a standard value.

9. The vehicle drive control apparatus of claim 1, wherein, when the extracted series of road sections includes multiple parallel series of road sections, the section map memory prioritizes, as the high-probability road section, a series of road sections including a most-traveled series of road sections from among the multiple parallel series of road sections, and
the section map memory separately stores, as the high-probability road section, other series of road sections in the multiple parallel series of road sections besides the most-traveled series of road sections.

10. The vehicle drive control apparatus of claim 1, wherein, when the vehicle is determined as having departed from the road section for which the schedule of control index is defined for more than a standard number of times, the section extraction unit extracts again, for each of travel directions of the road section, the series of road sections including each of the road sections traveled for above-the-threshold times, and
the section map memory stores, as the section map, the extracted series of road sections in the storage.

11. The vehicle drive control apparatus of claim 1, wherein, when a predetermined term has elapsed from definition of the schedule of the control index, the section extraction unit extracts again, for each of travel directions of the road section, the series of road sections including each of the road sections traveled for over-a-threshold times.

12. A travel section pick-up apparatus comprising:
a travel number counter for counting a number of travels of a road section in a travel route of a vehicle and for storing the number of travels of the road section by the vehicle in a storage for each of travel directions of the road section;
a section extraction unit for extracting, for each of travel directions of the road section, the road section that is traveled for over-a-threshold times based on the stored number of travels of the road section in the storage;
a section map memory for storing, as a section map, a series of road sections extracted by the section extraction unit in the storage; and
a section series identifying unit for identifying a specific series of road sections as a high-probability road section that is highly probably traveled by the vehicle when the vehicle is determined to enter the specific series of road sections specified by the section map.

13. A method of picking up a road section comprising:
providing a storage for storing data;
counting a number of travels of a road section in a ravel route of a vehicle and storing the number of travels of the road section by the vehicle in the storage for each of travel directions of the road section;
extracting, for each of travel directions of the road section, the road section that is traveled for over-a-threshold times based on the stored number of travels of the road section in the storage;
storing, as a section map, a series of road sections derived from the extracting of the road section in the storage; and
identifying a specific series of road sections as a high-probability road section that is highly probably traveled by the vehicle when the vehicle is determined to enter the specific series of road sections specified by the section map.

* * * * *